US011139489B2

(12) United States Patent
Chatroux et al.

(10) Patent No.: US 11,139,489 B2
(45) Date of Patent: Oct. 5, 2021

(54) SYSTEM FOR ELECTROLYSING WATER (SOEC) OR FUEL-CELL STACK (SOFC) OPERATING UNDER PRESSURE, THE REGULATION OF WHICH IS IMPROVED

(71) Applicant: COMMISSARIAT A L'ENERGIE ATOMIQUE ET AUX ENERGIES ALTERNATIVES, Paris (FR)

(72) Inventors: Andre Chatroux, Tullins (FR); Georges Gousseau, Moirans (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 37 days.

(21) Appl. No.: 15/765,908

(22) PCT Filed: Oct. 5, 2016

(86) PCT No.: PCT/EP2016/073727
§ 371 (c)(1),
(2) Date: Apr. 4, 2018

(87) PCT Pub. No.: WO2017/060267
PCT Pub. Date: Apr. 13, 2017

(65) Prior Publication Data
US 2018/0287172 A1 Oct. 4, 2018

(30) Foreign Application Priority Data
Oct. 6, 2015 (FR) ...................................... 1559504

(51) Int. Cl.
*H01M 8/04089* (2016.01)
*C25B 15/02* (2021.01)
(Continued)

(52) U.S. Cl.
CPC .......... *H01M 8/04104* (2013.01); *C25B 1/04* (2013.01); *C25B 9/73* (2021.01); *C25B 15/02* (2013.01);
(Continued)

(58) Field of Classification Search
None
See application file for complete search history.

(56) References Cited

U.S. PATENT DOCUMENTS 6,689,499 B2 * 2/2004 Gillett ................ H01M 8/04111
429/429
7,979,165 B2 * 7/2011 Gotoh ................... G01F 1/6847
137/2

(Continued)

OTHER PUBLICATIONS

Seidler et al., "Pressurized solid oxide fuel cells: Experimental studies and modeling" Journal of Power Sources, vol. 196, No. 17, Oct. 7, 2011, pp. 7195-7202. (Year: 2011).*

(Continued)

*Primary Examiner* — Harry D Wilkins, III
(74) *Attorney, Agent, or Firm* — Oblon, McClelland, Maier & Neustadt, L.L.P.

(57) ABSTRACT

A system regulating pressure of a reactor for hightemperature electrolysis or co-electrolysis (HTE) or to an SOFC fuel-cell stack operating under pressure. The operation of the system includes: regulating upstream of one of the chambers, a flow rate of moisture-containing gas DH to guarantee electrochemical stability of a preset operating point; and controlling pressure by virtue of valves arranged downstream of the stack, for regulating gases including the moisture-containing gas, and which are generally hot.

10 Claims, 10 Drawing Sheets

(51) Int. Cl.
*H01M 8/0438* (2016.01)
*H01M 8/04746* (2016.01)
*C25B 1/04* (2021.01)
*C25B 9/73* (2021.01)
*H01M 8/04992* (2016.01)
*H01M 8/04701* (2016.01)
*H01M 8/124* (2016.01)

(52) U.S. Cl.
CPC ... *H01M 8/04432* (2013.01); *H01M 8/04708* (2013.01); *H01M 8/04753* (2013.01); *H01M 8/04783* (2013.01); *H01M 8/04992* (2013.01); *H01M 8/0441* (2013.01); *H01M 8/04402* (2013.01); *H01M 8/04425* (2013.01); *H01M 2008/1293* (2013.01); *Y02E 60/36* (2013.01)

(56) References Cited

U.S. PATENT DOCUMENTS

| | | |
|---|---|---|
| 2002/0081471 A1 | 6/2002 | Keegan et al. |
| 2005/0061371 A1* | 3/2005 | Kimbara ............... F17C 13/025 137/266 |
| 2011/0031423 A1* | 2/2011 | Herrmann ............. F16D 25/123 251/12 |
| 2012/0325654 A1* | 12/2012 | Le Gallo ................. C25B 1/04 204/277 |

OTHER PUBLICATIONS

International Search Report dated Dec. 13, 2016 in PCT/EP2016/073727, citing documents AA and AU through AY therein, 4 pages.
Seidler, S., et al., "Pressurized Solid Oxide Fuel Cells: Experimental Studies and Modeling", Journal of Power Sources, vol. 196 No. 17, XP 55260130, Oct. 7, 2011, pp. 7195-7202.
O'Brien, J.E., et al., "High Temperature Electrolysis Pressurized Experiment Design, Operation, and Results", Retrieved from the Internet: URL: https://inldigitallibrary.inl.gov/sti/5516323.pdf, XP055260106, Sep. 13, 2012, pp. 1-15 with cover pages.
Sun, X., et al., "Performance Characterization of Solid Oxide Cells Under High Pressure", Fuel Cells, vol. 15 No. 5, Jul. 2, 2015, XP055260683, pp. 697-702.
Jensen, S.H., et al., "Hydrogen and synthetic fuel production using pressurized solid oxide electrolysis cells", International Journal of Hydrogen Energy, vol. 35 No. 18, XP027235608, Sep. 1, 2010, pp. 9544-9549.
Burke, A.A., et al., "Pressurized testing of a planar solid oxide fuel cell stack", International Journal of Hydrogen Energy, vol. 38 No. 31, XP028730762, Sep. 10, 2013, pp. 13774-13780.

* cited by examiner

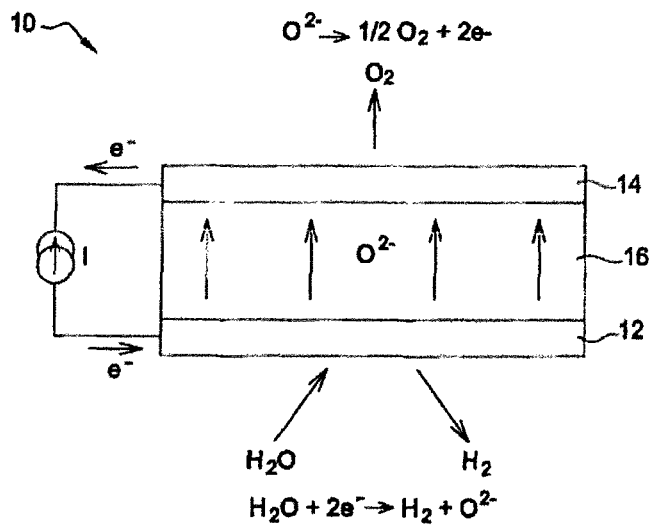
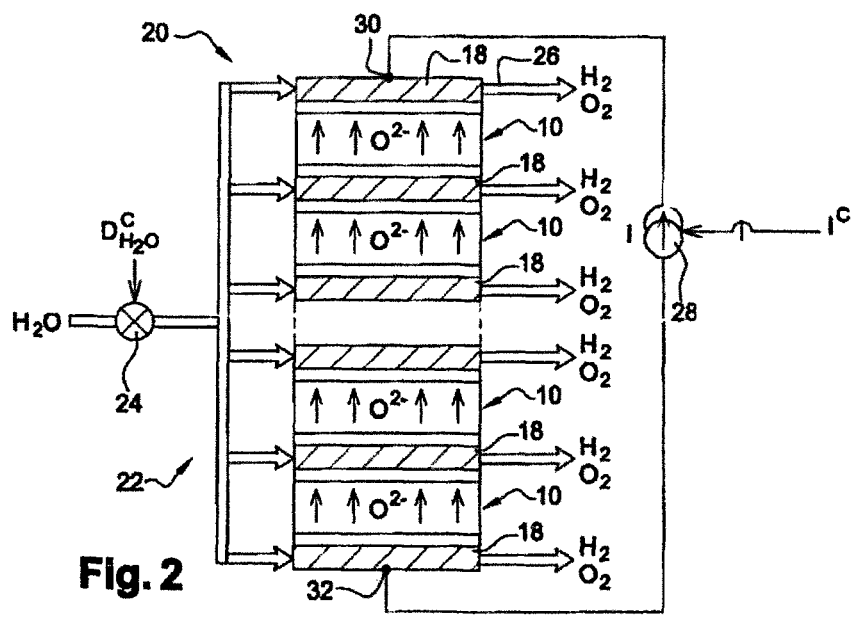

EQUALIZING GAS INLET | AIR INLET | H₂O INLET | EQUALIZING GAS OUTLET

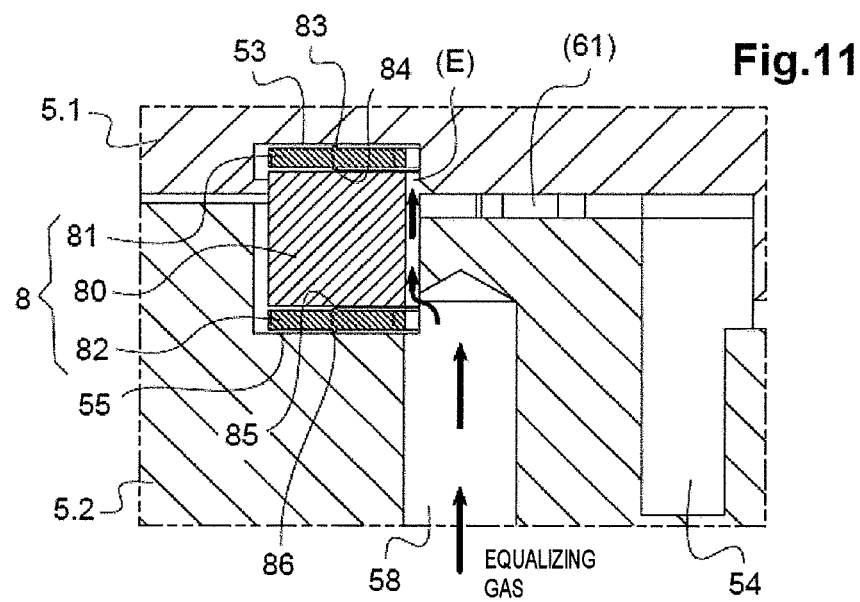
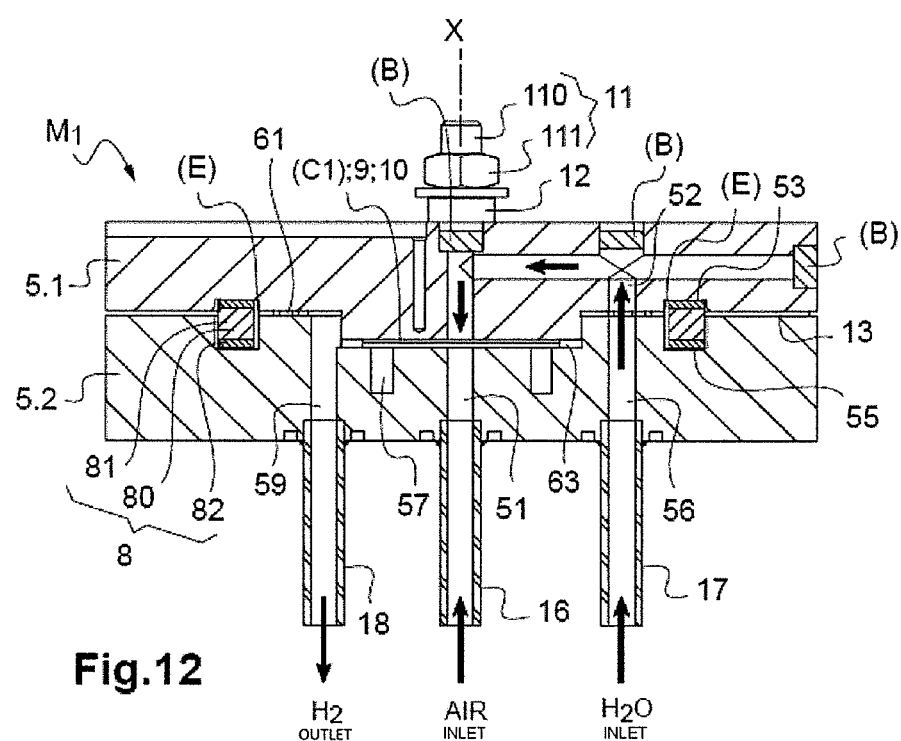

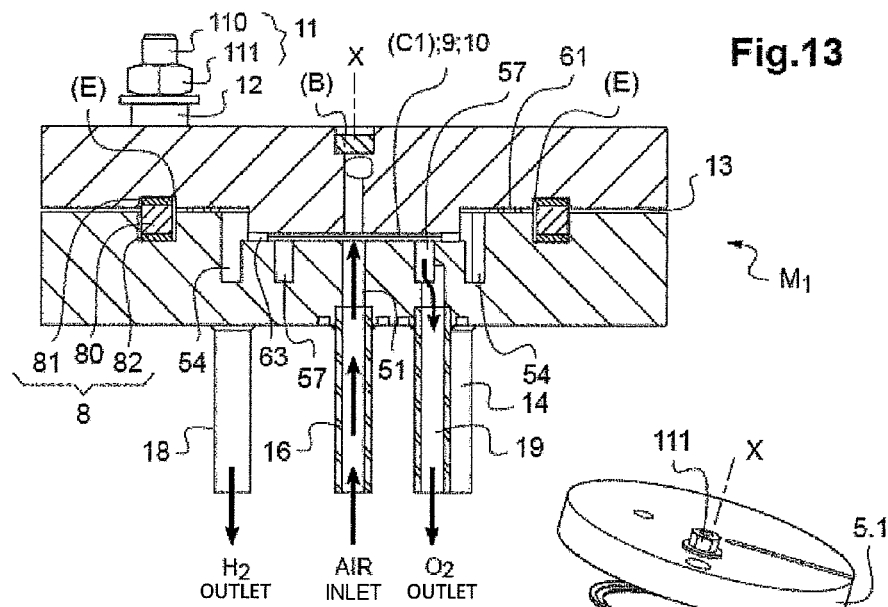
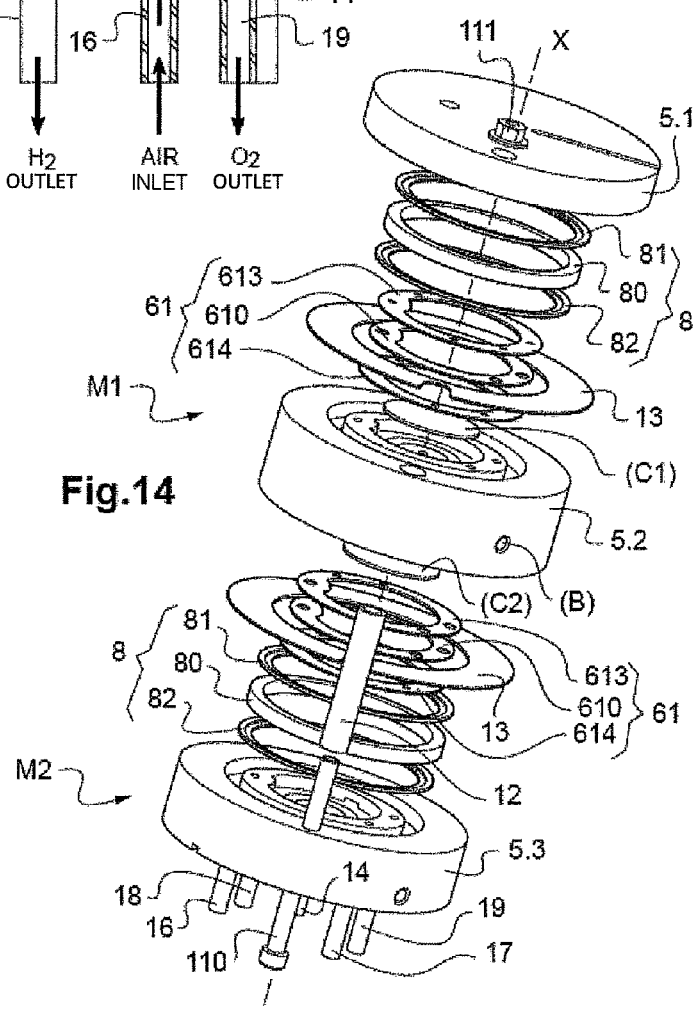

“SYSTEM FOR ELECTROLYSING WATER (SOEC) OR FUEL-CELL STACK (SOFC) OPERATING UNDER PRESSURE, THE REGULATION OF WHICH IS IMPROVED”

TECHNICAL FIELD

The present invention relates to the field of solid oxide fuel-cell (SOFC) stacks and that of high-temperature water electrolysis (HTE meaning "High-temperature Electrolysis", or HTSE meaning "High-Temperature Steam Electrolysis") also with solid oxides (SOEC meaning "Solid Oxide Electrolyte Cell").

The invention more particularly relates to the pressure regulation of a HTE electrolyzer system or of an SOFC stack operating under pressure.

Although described mainly with reference to the use of high-temperature water electrolysis, the invention is used equally as well for an SOFC stack.

PRIOR ART

Electrolyzing water is an electrolytic reaction which breaks down the water into dioxygen and dihydrogen gas using an electric current according to the reaction:

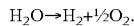

$H_2O \rightarrow H_2 + \tfrac{1}{2}O_2.$

In order to electrolyze water, it is advantageous to undertake this at high temperature typically between 600 and 950° C., since some of the energy necessary for the reaction may be supplied by the heat which is less expensive than electricity and the activation of the reaction is more efficient at high temperature and does not require a catalyst.

As shown in the diagram of FIG. 1, a solid oxide electrolysis cell 10, or "SOEC" ("Solid Oxide Electrolyte Cell"), particularly comprises:

- a first porous conductive electrode 12, or "cathode", intended to be fed with steam in order to produce dihydrogen.
- a second porous conductive electrode 14, or "anode", through which the dioxygen ($O_2$) produced by the electrolysis of the water injected onto the cathode escapes, and
- a solid oxide membrane (dense electrolyte) 16 sandwiched between the cathode 12 and the anode 14, the membrane 16 being anion-conductive for high temperatures, normally temperatures greater than 600° C.

By heating the cell 10 at least to this temperature and by injecting an electric current I between the cathode 12 and the anode 14, the water on the cathode 12 is then reduced, which generates dihydrogen ($H_2$) at the cathode 12 and dioxygen at the anode 14.

In order to implement the electrolysis at high temperature, it is known to use an SOEC ("Solid Oxide Electrolyte Cell") electrolyzer, made up of a stack of elementary units each including a solid oxide electrolysis cell, made up of three layers, anode/electrolyte/cathode, superposed on one another, and interconnection plates made from metal alloys which are also called bipolar plates, or interconnects. The function of the interconnects is to ensure both the passage of the electric current and the circulation of the gases in the vicinity of each cell (injected steam, hydrogen and oxygen extracted from a HTE electrolyzer; injected air and hydrogen and water extracted from an SOFC stack) and to separate the anode and cathode compartments which are the compartments for circulation of the gases on the side of the anodes and of the cathodes of the cells, respectively. To carry out the HTE high-temperature steam electrolysis, steam $H_2O$ is injected into the cathode compartment. Under the effect of the current applied to the cell, the dissociation of the molecules of water in steam form is produced at the interface between the hydrogen electrode (cathode) and the electrolyte: this dissociation produces dihydrogen gas $H_2$ and oxygen ions. The dihydrogen is collected and evacuated at the outlet of the hydrogen compartment. The oxygen ions $O^{2-}$ migrate through the electrolyte and recombine into dioxygen at the interface between the electrolyte and the oxygen electrode (anode).

A stack 20 of electrolysis cells, which is intended to produce a large amount of hydrogen, is illustrated by the schematic view of FIG. 2. In particular, the cells 10 are stacked upon one another while being separated by interconnection plates 18 connected to a steam feed 22 for the injection of this steam onto the cathodes of the cells 10 in accordance with a steam flow rate $D_{H_2O}$ set by a directable valve 24. The plates 18 are also connected to a gas collector 26 for the collection of the gases resulting from the electrolysis.

An interconnection plate stack and structure example is, for example, described in the patent application WO 2011/110676.

Such an electrolyzer may also operate with co-electrolysis, i.e. with a cathode inlet gas mixture composed of steam ($H_2O$) and carbon dioxide ($CO_2$). The cathode outlet mixture is then composed of hydrogen ($H_2$), steam ($H_2O$), carbon monoxide (CO) and carbon dioxide ($CO_2$).

For the effective implementation of the electrolysis by the stack 20, the stack is brought to a temperature greater than 600° C., normally a temperature between 600° C. and 950° C., the gas feed is started at a constant flow rate and a power supply source 28 is connected between two terminals 30, 32 of the stack 20 in order to circulate the current I therein.

A high-temperature solid oxide fuel-cell stack, more commonly known as an SOFC ("Solid Oxide Fuel Cell") stack and a HTSE electrolyzer may have identical structures, with only the operating mode thereof being different. By referring to FIG. 3, an electrochemical cell making up an SOFC stack comprises the same elements, i.e. the anode 12, the cathode 14, and the electrolyte 16, as an electrolysis cell.

A cell of the fuel-cell stack is fed, with constant flow rates, on the anode thereof with dihydrogen or another fuel such as methane $CH_4$, and on the cathode thereof with dioxygen that is pure or contained in the sent air, and is connected to a load C in order to deliver the produced electric current.

In a stack reactor as described above, the seal between the solid oxide cells 10 and the interconnection plates 18 is produced by joints which represent one of the weak points of the system.

Indeed, these glass or vitroceramic-based joints sealing the stack with respect the atmosphere are fragile and only tolerate a small excess pressure of approximately a few dozen or hundred millibars.

Until now, such systems only operate at atmospheric pressure even if some scientific studies begin to analyze operation under pressure.

The internal operation of an SOFC stack or of a HTE reactor under pressure, typically a few bar up to a few dozen bar, typically 30 bar, then requires a solution to prevent the loss of the sealing by the joints.

A solution is already known which consists in placing the HTE stack reactor or an SOFC stack within a sealed enclosure which itself is pressurized. It is possible to cite in this case the publication [1], the patent applications or patents FR 2957361A1, US2002/0081471 and U.S. Pat. No. 6,689, 499 B2 which disclose this type of solution. This known solution offers the advantage of being able to set the same pressure between the inside and outside of the stack. In other words, there is an equalizing of the pressures between the enclosure and the chambers (compartments) of the stack. Therefore, this allows operation at a raised pressure, of a few bar to a few dozen bar, without mechanically stressing the glass or vitroceramic joints.

Thus, as long as the pressure of each anode or cathode chamber (compartment) is generally equalized with the internal pressure of the enclosure, the sealing joints are only subjected to a small differential pressure, which is typically almost zero.

In electrolysis mode, the major disadvantage of such a solution is that it takes place at the cost of a loss in some of the produced hydrogen, which is burnt in the enclosure. Therefore, this is not currently a solution that may be envisaged on an industrial scale, in electrolysis mode.

Some high-temperature fuel-cell stacks are designed such that they are not sealed on the cathode side, which may simplify the operation under pressure since, in this case, the cathode is at the pressure of the enclosure.

In particular, the aforementioned patent U.S. Pat. No. 6,689,499 B2 implements this technique in fuel-cell stack mode, the recombination of the output gases being used to heat the stack.

In electrolysis mode, the difficulty also consists in constantly and simultaneously obtaining the same pressure (to within a few bar) in the enclosure, in each anode chamber and in each cathode chamber, in order to recover, as best as possible, the produced gases.

In other words, it is necessary to carry out a sufficiently precise pressure regulation on the lines for feeding and recovering the gases in the stack in order to restrain the stress of the small differential pressures on the joints.

However, one of the difficulties is due to the fact that the gas circulating in the cathode chambers contains a lot of steam, which may condense during the expansion thereof at atmospheric pressure.

Until now, heat science specialists have recommended regulation of pressure on dry gas. Therefore, this is generally what is implemented.

In this case, the studies summarized in the publications [2]-[6] may be cited. In the majority of these studies, the tests relate to SOFC stacks for which the gas is dry or hardly wet, or then to SOEC electrolyzer systems in which the gases are dried in a condenser fitted inside the enclosure under pressure. Moreover, in the majority of the cases, only an operating point at 3 bar or at 5 bar is possible.

In the related field of proton exchange membrane (PEM) fuel-cell stacks, the stresses on the joints and the pressures between the chambers are totally different since the membrane may tolerate a differential pressure of several bar. However, it is possible to note the patent application WO2012/008954A1 which relates to a pressure regulation on wet gas thanks to a pump with counter-flow operation and the U.S. Pat. No. 7,985,507B2 which discloses a regulation by means of an on-off valve. The solutions disclosed in this application and this patent cannot however be used in solid oxide systems having much larger stresses.

Another difficulty of the solution consisting in arranging a HTE electrolyzer or an SOFC stack inside a pressurized enclosure is linked to the fact that the stack comprises (anode and cathode) chambers for circulating the gases which intrinsically have a small volume compared to that of the enclosure. The pressure regulation is difficult in this case, since the pressure variations inside the enclosure may be extremely slow compared to those inside the chambers of the stack.

In this way, in the case of rapid pressure increase in either of the chambers of the stack, it will be very difficult to raise the pressure of the chamber just as quickly. In order to remove this stress, the study [7] proposes using a buffer volume at the outlet of each line for circulating gas of the stack such as to have three identical volumes of gas, i.e. a volume comprising the anode chambers and a first buffer volume, a volume comprising the cathode chambers and a second buffer volume, and the volume defined by the enclosure. Thus, by having three identical volumes, it is possible to use the same on-off valves in order to regulate the pressure of the enclosure and that prevailing inside the chambers of the stack. This solution is restrictive since it amounts to multiplying the volume of the pressure enclosure by a factor of 3 and, therefore, the cost of the system is much greater. These buffer volumes are also detrimental in reversible operation mode since they slow the time for switching from one mode to the other since it is necessary to purge them with neutral gas on each occasion.

In other words, in the prior art relating to high-temperature electrolyzers and fuel-cell stacks, there is no satisfactory solution for a wet gas pressure regulation system which covers an operating range from the atmospheric pressure up to a few dozen bar.

Therefore, there is a need to improve the systems of electrolyzers or fuel-cell stacks operating under pressure, particularly such as to regulate, as best as possible, the pressure within an operating range from the atmospheric pressure up to a few dozen bar.

The aim of the invention is to at least partially meet this need.

DISCLOSURE OF THE INVENTION

For this purpose, the invention relates to a system including:
  at least one first chamber in which a first gas, which is a potentially wet gas, is suitable for circulating;
  at least one first feed line that suitable for feeding potentially wet gas to the inlet of the first chamber up to a maximum operating pressure $P_{max}$, the first feed line comprising a first flow rate regulator suitable for regulating the flow rate of the first gas $D_H$ between a zero value and a maximum value $D_{H,max}$;
  at least one second chamber in which a second gas is suitable for circulating;
  at least one second feed line suitable for feeding second gas to the inlet of the second chamber, the second feed line comprising a second flow rate regulator suitable for regulating the flow rate of the second gas $D_O$ between a zero value and a maximum value $D_{O,max}$;
  an enclosure in which the first and second chambers are housed, in which enclosure a third gas, called an equalizing gas, is suitable for circulating, the enclosure being suitable for operating under pressure of the equalizing gas up to the maximum operating pressure $P_{max}$;
  a third feed line suitable for feeding the inside of the enclosure with equalizing gas, preferably air, the third feed line comprising a third flow rate regulator suitable for regulating the flow rate of the equalizing gas $D_{air}$ between a zero value and a maximum value $D_{air,max}$;
  sensors for pressure ($P_H$, $P_O$, $P_{air}$), which are suitable for measuring the pressure in each of the first and second chambers and in the enclosure, between the atmospheric pressure and the maximum pressure value $P_{max}$;

at least three regulating valves ($V_H$, $V_O$, $V_{air}$), arranged outside the enclosure and on the outlet line of the first chamber or chambers, of the second chamber or chambers and of the enclosure, respectively, each valve being suitable for each operating at a temperature greater than the condensation temperature of the wet gas at the maximum pressure $P_{max}$ considered, each valve being suitable to be opened from 0% to 100% and having a capacity $K_v$ suited to the maximum pressure $P_{max}$ and to the average flow rate of the gas considered on each of the three outlet lines;

means for heating the lines containing wet gas to a temperature greater than the condensation temperature of this wet gas at the maximum pressure $P_{max}$ considered;

command and automatic control means for commanding and automatically controlling the regulating valves ($V_H$, $V_O$, $V_{Air}$) as a function of the differences in pressure values measured by the pressure sensors such as to obtain a minimum difference in pressure between the first chamber or chambers, the second chamber or chambers and the enclosure, system in which, by including the volume of the lines for circulating gas upstream and downstream of the enclosure and of the chambers, i.e. $Vol_H$ being the volume of the first chamber or chambers, $Vol_O$ the volume of the second chamber or chambers and $Vol_{air}$ the volume of the enclosure, the flow rate regulators are dimensioned to comply with the ratio:

$$\frac{Vol_H}{D_{H,max}} = \frac{Vol_O}{D_{O,max}} = \frac{Vol_{air}}{D_{air,max}}.$$

"Potentially wet gas" in this case and in the scope of the invention means a gas having a state that may already be wet at inlet to the system according to the invention or pass into a wet state during the production thereof or the passage thereof within the system.

"Wet gas", in this case and in the scope of the invention, means a gas (or a gas mixture) containing a steam part or a gas composed solely of steam.

Optionally, the gas may contain a vapor part resulting from the vaporization of a liquid other than water.

According to an alternative, the system according to the invention comprises a condenser for the wet gas, arranged downstream of the regulating valve $V_H$, on the outlet line of the first chamber or chambers. Thus, the system does not necessarily comprise a condenser. Indeed, in some uses, the wet gas at the outlet of the system may be used as is without it being necessary to condense it. This may be the case if the wet gas is to feed a certain type of reactor or reservoir, such as a methanation reactor, etc.

According to an advantageous embodiment, the command and automatic control means are furthermore suitable for commanding and automatically controlling the flow rate regulators for the second gas $D_O$ and for the equalizing gas $D_{Air}$ as a function of the opening state of the regulating valves for the second gas $V_O$ and for the equalizing gas $V_{Air}$, in order to prevent the complete opening or closing states of the valves for the second gas $V_O$ and for the equalizing gas $V_{Air}$.

According to an advantageous use, the system comprises a high-temperature electrolysis or co-electrolysis (HTE) reactor comprising a stack of solid oxide elementary (co-) electrolysis cells each comprising an anode, a cathode, and an electrolyte inserted between the anode and the cathode, the cells being electrically connected in series, the stack comprising two electric terminals for feeding current to the cells and defining chambers for circulating steam and hydrogen or steam, hydrogen and carbon dioxide ($CO_2$) on the cathodes as first chambers, and chambers for circulating air or nitrogen or oxygen or a gas mixture containing oxygen on the anodes as second chambers.

According to another advantageous use, the system comprises a high-temperature fuel-cell (SOFC) stack comprising a stack of solid oxide elementary electrochemical cells each comprising an anode, a cathode, and an electrolyte inserted between the anode and the cathode, the cells being electrically connected in series, the stack comprising two electric terminals for the cell current recovery and defining chambers for circulating dihydrogen or another fuel gas or a mixture containing a fuel gas on the anodes as first chambers and chambers for circulating air or nitrogen or oxygen or a gas mixture containing oxygen on the cathodes as second chambers.

In this case, the gas at the inlet of the first chamber is not necessarily wet, however it is wet at the outlet since steam is a product of the electrochemical reaction in this first chamber.

The system may be reversible, wherein the fuel-cell stack may be a high-temperature electrolyzer, and vice versa.

The invention is used for "average temperature", i.e. 400° C., fuel-cell stacks or electrolyzer, or PCFC meaning "Proton Ceramic Fuel Cell".

Generally, outside the technical field of the solid oxide electrochemical systems, the invention is used for all systems for which there is a requirement for pressure regulation of several sealed chambers housed in a main enclosure and in each of which a gas under pressure is to be circulated.

According to an alternative of the invention, the system may comprise at least three sensors for absolute pressure ($P_H$, $P_O$, $P_{air}$), which are suitable for each measuring the pressure in each of the first chambers, in each of the second chambers and in the enclosure, respectively.

Alternatively, the system may comprise at least one sensor for absolute pressure $P_H$, suitable for each measuring the pressure in each of the first chambers, and comprising at least two differential sensors for pressure which are suitable for measuring the difference in pressure between the second chamber or chambers and the first chamber or chambers $\Delta P_O = (P_O - P_H)$ and between the enclosure and the first chamber or chambers $\Delta P_{air} = (P_{air} - P_H)$, respectively.

According to another alternative of the invention, the system may further comprise bypass valves $V_{H,bypass}$ $V_{O,bypass}$ and $V_{air,bypass}$ which are each arranged in parallel with the regulating valves $V_H$, $V_O$ and $V_{air}$, respectively. These bypass valves allow an operation at the atmospheric pressure when they are open. To this end, these bypass valves have a passage diameter of the same approximate size as that of the lines for circulating the gases such as to reduce the head loss at the passage.

Thus, the invention consists essentially in:

regulating, upstream of one of the chambers, the wet gas flow rate $D_H$ such as to ensure the electrochemical stability of the predetermined operating point;

governing the pressure thanks to the regulating valves $V_H$, $V_O$ and $V_{Air}$ arranged downstream of the stack on the gases including the wet gas, which are moreover generally hot.

During the operation of the system, an expansion of the gases will take place at the regulating valves, which results in cooling thereof.

Thus, the solution according to the invention goes against the usual recommendations of the heat science specialists who reject such cooling since they consider that this may lead to the formation of droplets of liquid water which could block the hole of the valve.

In order to prevent this, heat science specialists rather propose drying the gases before they arrive on the regulating valves.

Yet, the inventors consider, through the experience thereof, that the solution according to the invention which consists in regulating wet gas operates extremely well provided that the lines containing steam are kept at a temperature greater than the condensation temperature of the steam at the maximum pressure $P_{max}$ considered.

Furthermore, a wet gas regulation even has the advantage, for solid oxide systems, like a HTE reactor or an SOFC stack, of contributing, thanks to this expansion, to the cooling of the gas before it is sent into the condenser in which it will be cooled in order to eliminate the majority of the steam.

In order to have pressure changes of the same approximate size in each of the three compartments, namely the first chamber or chambers, the second chamber or chambers, and the enclosure, it is preferably recommended to have the same ratio between the considered compartment volume and the maximum gas flow rate that may be injected therein.

By including the volume of the lines for circulating gas upstream and downstream of the enclosure and of the chambers, i.e. $Vol_H$ being the volume of the first chamber or chambers, $Vol_O$ the volume of the second chamber or chambers and $Vol_{air}$ the volume of the enclosure, the gas flowmeters (flow rate regulators) are preferably dimensioned in order to comply with the ratio:

$$\frac{Vol_H}{D_{H,max}} = \frac{Vol_O}{D_{O,max}} = \frac{Vol_{air}}{D_{air,max}}$$

In the specific case of a system for which there is a risk that the enclosure is not perfectly sealed, it is ensured that the maximum equalizing gas flow rate inside the enclosure $D_{Air,max}$ is overdimensioned such as to take into account the leak(s) of the enclosure for which it will be necessary to compensate via an increase in the gas flow rate.

Contrary to some solutions of the prior art, particularly that disclosed in the publication [7], the regulation of the flow rates according to the invention occurs without it being necessary to use buffer volumes.

The invention also relates to an operating method for the system that has just been described, comprising the following steps:
a/ defining the following operating setpoints:
a1/ defining a flow rate $D_H$ that corresponds to the quantity of potentially wet gas necessary for a predetermined electrochemical operating point;
a2/ defining a flow rate $D_O$ which corresponds to the quantity of second gas necessary for a predetermined electrochemical operating point;
a3/ defining a flow rate $D_{air}$ which corresponds to the quantity of second gas necessary for detection and safety with regard to the leaks and for preventing the formation of an explosive atmosphere in the enclosure;
a4/ defining a pressure $P_{setpoint}$ for the predetermined operating point;
a5/ defining the differential pressure $\Delta P_{O,setpoint}$ corresponding to the deviation in pressures between that prevailing in the second chamber or chambers and that in the first chamber or chambers;
a6/ defining the differential pressure $\Delta P_{air,setpoint}$ corresponding to the deviation in pressures between that in the enclosure and that prevailing in the first chamber or chambers;
b/ using the following regulations:
b1/ actuating the wet gas flow rate regulator(s) in order to regulate the flow rate $D_H$ of the wet gas;
b2/ actuating the second-gas flow rate regulator(s) in order to regulate the flow rate $D_O$ entering the second chamber or chambers;
b3/ actuating the equalizing gas flow rate regulator(s) in order to regulate the flow rate $D_{air}$ entering the enclosure;
b4/ actuating the regulating valve $V_H$ for the wet gas in order to regulate the actual pressure $P_H$ of the first chamber or chambers to the setpoint value $P_{setpoint}$;
b5/ actuating the valve $V_O$ for the second gas such that the actual differential pressure between the second chamber or chambers and the first chamber or chambers $\Delta P_O=(P_O-P_H)$, is regulated as a function of the error measured with respect to the setpoint $(\Delta P_{O,setpoint}-\Delta P_O)$, such that the pressure $P_O$ of the second gas follows that $P_H$ of the first chamber or chambers with the setpoint differential pressure $\Delta P_{O,setpoint}$;
b6/ actuating the valve $V_{air}$ for the equalizing gas such that the actual differential pressure between the enclosure and the first chamber or chambers $\Delta P_{air}=(P_{air}-P_H)$ is regulated as a function of the error measured with respect to the setpoint $(\Delta P_{air,setpoint}-\Delta P_{air})$, such that the pressure $P_{air}$ of the equalizing gas of the enclosure that $P_H$ of the first chamber or chambers with the setpoint differential pressure $\Delta P_{air,setpoint}$.

According to an alternative of the method, there is also provided a flow rate increasing step for the second gas $D_O$ and for the equalizing gas $D_{Air}$ if the regulating valves for the second gas $V_O$ and for the equalizing gas $V_{Air}$, respectively, are close to a complete closing state.

On the contrary, it is possible to provide a flow rate reducing step for the second gas $D_O$ and for the equalizing gas $D_{Air}$ if the regulating valves for the second gas $V_O$ and for the equalizing gas $V_{Air}$, respectively, are close to a complete opening state.

In other words, in addition to the regulations of the steps b1/ to b6/, it is possible to provide an increase or decrease of the flow rates $D_O$ and $D_{air}$, preferably by automatic control, when the regulating valves for the second gas $V_O$ and for the equalizing gas in the enclosure $V_{air}$ risk reaching the closing or opening limits thereof. Thus:
if $V_O$ risks closing, then the flow rate $D_O$ is increased;
if $V_O$ risks opening completely, then the flow rate $D_O$ is reduced;
if $V_{air}$ risks closing, then the flow rate $D_{air}$ is increased;
if $V_{air}$ risks opening completely, then the flow rate $D_{air}$ is reduced.

In the pressure rise stage, the regulating valve $V_H$ for the potentially wet gas may close completely. In this case, when the system is a solid oxide electrochemical system, then it is ensured that safety measures are taken to stop the production of gas or to maintain the flow rate of the gas at a minimum value.

In particular, when the system comprises a (co-)electrolysis reactor, the complete closure of the regulating valve $V_H$ for the wet gas (steam and produced hydrogen), there is practically no longer any circulation of the reactive gases on the electrolysis cells, and it is therefore recommended to implement a safeguard in order to stop the production of hydrogen by giving a zero current intensity setpoint.

Likewise, in SOFC stack mode, it is perhaps necessary to maintain an oxygen flow rate in order to feed the cells with oxidant. This makes it possible to define an oxygen flow rate minimum value $D_O$ below which the flow rate regulator cannot fall. Another possibility consists in implementing a safeguard to stop the production of electricity by giving a zero current intensity setpoint.

DETAILED DESCRIPTION

Other advantages and features of the invention will emerge more clearly upon reading the detailed description of examples for implementing the invention given by way of illustration and in a nonlimiting manner with reference to the following figures wherein:

FIG. 1 is a schematic view of an elementary electrochemical cell of a HTSE electrolyzer;

FIG. 2 is a schematic view of a stack of cells according to FIG. 1;

FIG. 11 is a detail view of FIG. 10, showing the passage of the equalizing gas into the housing recesses for the device for insulation and sealing between the inside and outside of the module;

FIGS. 12 and 13 are sectional views of a module assembled according to FIG. 9, the section being produced in the plane for circulating the carried steam and the produced hydrogen, and in the plane for circulating the carried air and the produced oxygen, respectively;

FIG. 14 is an exploded view of an embodiment of a HTE reactor having a stack of two modules according to the patent application filed in France on Dec. 18, 2014 under the no. 14 62699 and used as part of a system according to the invention;

Figure 3:
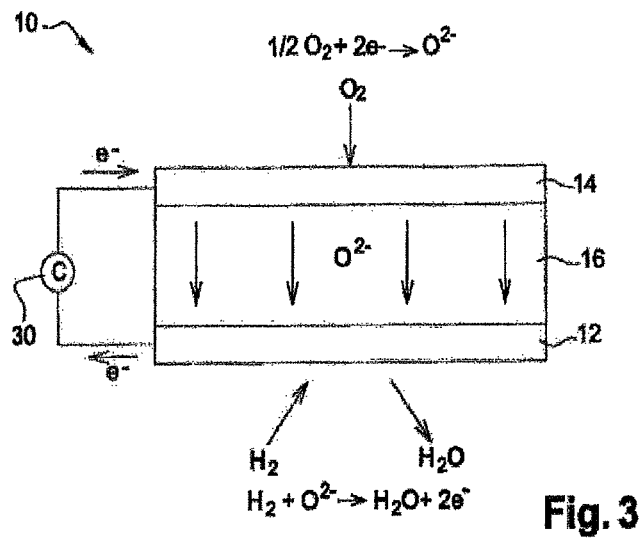
FIG. 3 is a schematic view of an electrochemical cell of an SOFC stack.

FIGS. 1-3 relating to the prior art have already been commented upon in the preamble. Therefore, they are not detailed hereafter.

For the sake of clarity, the same elements of a HTE reactor according to the prior art and of a HTE reactor which is used as part of a system according to the invention are designated by the same reference numbers.

It is specified in this case in the entirety of the present application that the terms "lower", "upper", "top", "bottom", "inside", "outside", "internal", "external" are to be understood with reference to an interconnect according to the invention in a cross-sectional view along the symmetry axis X.

It is also specified that the terms "upstream", "downstream", "inlet", "outlet" are to be considered with respect to the direction of circulation of the gases.

It is also specified that the modules of electrolyzers or of fuel-cell stacks described are of solid oxide type (SOEC meaning "Solid Oxide Electrolyte Cell" or SOFC, meaning "Solid Oxide Fuel Cell") operating at high temperature.

Thus, all of the constituents (anode/electrolyte/cathode) of a cell for electrolysis or fuel-cell stack are ceramics. The operating high temperature of an electrolyzer (electrolysis reactor) or of a fuel-cell stack is typically between 600° C. and 950° C.

Typically, the characteristics of an SOEC elementary electrolysis cell suitable for the invention, of the cathode supported type (CSC), may be those indicated as follows in the table below.

TABLE

| Electrolysis cell | Unit | Value |
|---|---|---|
| Cathode 2 | | |
| Constituent material | | Ni—YSZ |
| Thickness | µm | 315 |
| Thermal conductivity | W m$^{-1}$ K$^{-1}$ | 13.1 |
| Electrical conductivity | Ω$^{-1}$ m$^{-1}$ | 10$^5$ |
| Porosity | | 0.37 |
| Permeability | m$^2$ | 10$^{-13}$ |
| Tortuosity | | 4 |
| Current density | A · m$^{-2}$ | 5300 |
| Anode 4 | | |
| Constituent material | | LSM |
| Thickness | µm | 20 |
| Thermal conductivity | W m$^{-1}$ K$^{-1}$ | 9.6 |
| Electrical conductivity | Ω$^{-1}$ m$^{-1}$ | 1 10$^4$ |
| Porosity | | 0.37 |
| Permeability | m$^2$ | 10$^{-13}$ |
| Tortuosity | | 4 |
| Current density | A · m$^{-2}$ | 2000 |
| Electrolyte 3 | | |
| Constituent material | | YSZ |
| Thickness | µm | |
| Resistivity | Ω m | 0.42 |

Figure 4:
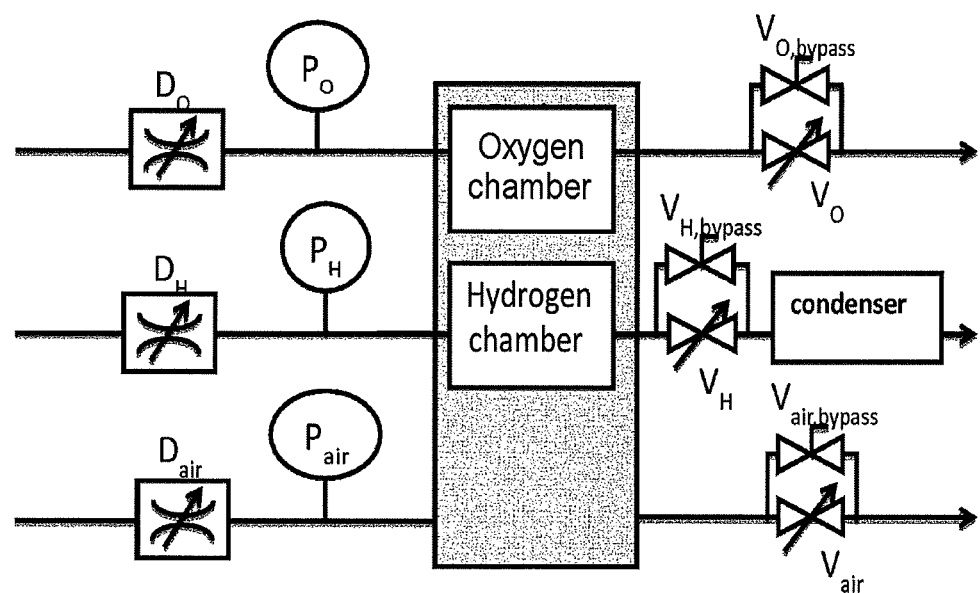
FIG. 4 is a schematic view of a system according to the invention comprising a HTE electrolyzer, the figures showing the sensors and flow rate regulators necessary for the regulation of pressure in the chambers for circulating the steam and hydrogen, the oxygen and in the enclosure under pressure which houses the chambers.

Referring to FIG. 4, the system according to the invention is pressure-regulated from the atmospheric pressure to a pressure chosen to be approximately 30 bar.

The system firstly comprises a high-temperature electrolysis or co-electrolysis (HTE) reactor comprising a stack 20 of solid oxide elementary (co-)electrolysis cells each comprising an anode, a cathode, and an electrolyte inserted between the anode and cathode, the cells being electrically connected in series, the stack comprising two electric terminals for feeding current to the cells and defining chambers 21 for circulating steam and hydrogen or steam, hydrogen and carbon dioxide ($CO_2$) on the cathodes, and chambers 23 for circulating air or nitrogen or oxygen or a gas mixture containing oxygen on the anodes.

The system further comprises:
- a feed line that is suitable to feed steam to the inlet of the chambers 21 up to a maximum operating pressure $P_{max}$, on which a flow rate regulator is arranged, which flow rate regulator is suitable for regulating the flow rate of the steam and of the produced hydrogen $D_H$ between a zero value and a maximum value $D_{H,max}$;
- a feed line that is suitable to feed oxygen to the inlet of the chambers 23, on which a flow rate regulator is arranged, which flow rate regulator is suitable for regulating the flow rate of oxygen $D_O$ between a zero value and a maximum value $D_{O,max}$;
- an enclosure 40 in which the stack 20 with the chambers 21, 23 thereof is housed, in which enclosure air as equalizing gas is suitable for circulating, the enclosure being suitable for operating under pressure up to the maximum operating pressure $P_{max}$;
- a feed line suitable for feeding the inside of the enclosure with air, and on which a flow rate regulator is arranged, which flow rate regulator is suitable for regulating the flow rate of air $D_{air}$ between a zero value and a maximum value $D_{air,max}$;
- sensors for pressure $P_H$, $P_O$, $P_{air}$, which are suitable for measuring the pressure in the chambers 21, 23 and in the enclosure 40, between the atmospheric pressure and the maximum pressure value $P_{max}$;
- at least three regulating valves $V_H$, $V_O$, $V_{air}$ arranged outside the enclosure 40 and on the outlet line of the chambers 21, of the chambers 23 and of the enclosure 40, respectively, each valve being suitable for each operating at a temperature greater than the condensation temperature of the wet gas at the maximum pressure $P_{max}$ considered, each valve being suitable to be opened from 0% to 100% and having a capacity $K_v$ suited to the maximum pressure $P_{max}$ and to the average flow rate of the gas considered on each of the three outlet lines;
- means for heating the lines of the steam and of the produced hydrogen to a temperature greater than the condensation temperature of this wet gas at the maximum pressure $P_{max}$ considered;
- a condenser 50, arranged downstream of the regulating valve $V_H$ on the outlet line of the chambers 21;
- command and automatic control means for commanding and automatically controlling the regulating valves ($V_H$, $V_O$, $V_{air}$) as a function of the differences in pressure values measured by the pressure sensors such as to obtain a minimum difference in pressure between the chambers 21, 23 and the enclosure 40.

By including the volume of the lines for circulating gas upstream and downstream of the enclosure and of the chambers, i.e. $Vol_H$ being the volume of the first chamber or chambers, $Vol_O$ the volume of the second chamber or chambers and $Vol_{air}$ the volume of the enclosure, the gas flowmeters (flow rate regulators) are preferably dimensioned to comply with the ratio:

$$\frac{Vol_H}{D_{H,max}} = \frac{Vol_O}{D_{O,max}} = \frac{Vol_{air}}{D_{air,max}}$$

The command and automatic control means particularly comprise a microprocessor and PID (Proportional Integral Derivative) controllers.

The means for heating the various wet gas lines are particularly temperature-regulated heater cables.

Figure 5:
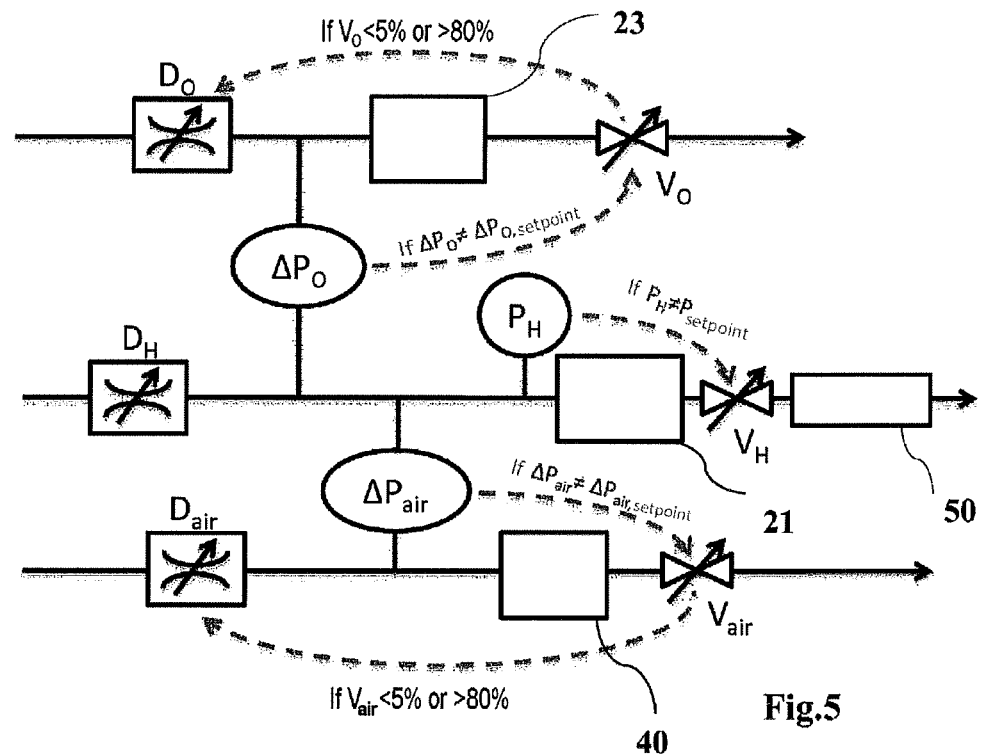
FIG. 5 is a schematic view of the sensors and flow rate regulators with the representation of the automatic control loops of the system according to FIG. 4.

Reference is now made to FIG. 5 which explains an example of regulating loops implemented automatically by a system according to the invention.

Beforehand, an operator responsible for the operation of the system defines operating setpoints.

The regulating loops according to the invention successively consist in:
- regulating, upstream of the stack 20, the flow rate of gas made up of a mixture of steam and hydrogen $D_H$ defined by the operator such as to ensure the stability of the operating point of the solid oxide cells;
- regulating, upstream of the stack 20, the flow rate of air $D_O$ defined by the operator such as to ensure the stability of the operating point of the solid oxide cells;
- regulating, upstream of the enclosure 40, the flow rate of air $D_{air}$ defined by the operator such as to ensure the safety of the system;
- regulating, to an operator setpoint $P_{setpoint}$, the pressure of the hydrogen chambers 21 thanks to the regulating valve $V_H$ downstream of the stack 20;
- regulating, to an operator setpoint $\Delta P_{O,setpoint}$, the deviation in pressure between oxygen and hydrogen chambers 23 and 21, $\Delta P_O=(P_O-P_H)$ thanks to the regulating valve $V_O$ placed downstream of the stack 20;
- regulating, to an operator setpoint $\Delta P_{air,setpoint}$, the deviation in pressure between the enclosure 40 and the hydrogen chambers 21, $\Delta P_{air}=(P_{air}-P_H)$ thanks to the regulating valve $V_{air}$ at the outlet of the enclosure 40;
- periodically adjusting, by a step of 10%, the flow rate of oxygen $D_O$ if the valve $V_O$ closes at less than 5% or opens at more than 80%;
- periodically adjusting, by a step of 10%, the flow rate of air $D_{air}$ if the valve $V_{air}$ closes at less than 5% or opens at more than 80%.

For example, the setpoints defined by the operator may be as follows:
- flow rate of steam/hydrogen $D_H$ in the range from 0 to 10 l/h;
- flow rate of air $D_O$ in the range from 0 to 10 l/h;
- flow rate of air $D_{air}$ in the range from 0 to 100 l/h;
- $P_{setpoint}$ in the range from the atmospheric pressure to 30 bar;
- $\Delta P_{O,setpoint}$ in the range from −100 to 100 mbar, preferably 50 mbar;
- $\Delta P_{air,setpoint}$ in the range from −100 to +100 mbar, preferably 50 mbar in order to prevent the leakage of hydrogen in the enclosure 40 under pressure.

Figure 6:
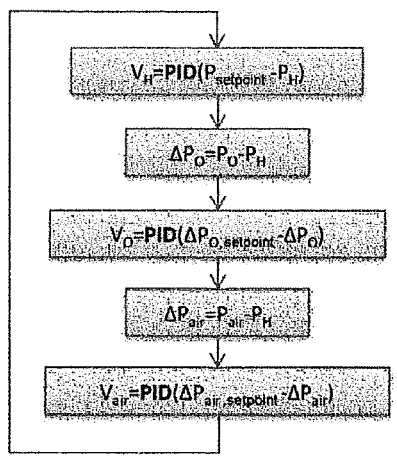
FIG. 6 is a computer flow diagram of the pressure regulations according to the embodiment of FIG. 4.

FIG. 6 gives the order and the detail of the regulations of the valves $V_O$, $V_H$ implemented by PID modules:
- automatically controlling the regulating valve $V_H$ with respect to the deviation ($P_{setpoint}-P_H$);
- calculating the differential pressure $\Delta P_O=(P_O-P_H)$;

automatically controlling the regulating valve $V_O$ with respect to the deviation ($\Delta P_O - \Delta P_{O,setpoint}$);

calculating the differential pressure $\Delta P_{air} = (P_{air} - P_H)$;

automatically controlling the regulating valve $V_O$ with respect to the deviation ($\Delta P_O - \Delta P_{O,setpoint}$).

The inventors have implemented the invention in an electrolysis reactor in accordance with the patent application filed in France on Dec. 18, 2014 under the no. 14 62699.

The detailed description of such a reactor having one or more modules M1, M2 is taken up again later with reference to FIGS. 9-18.

Figure 7:
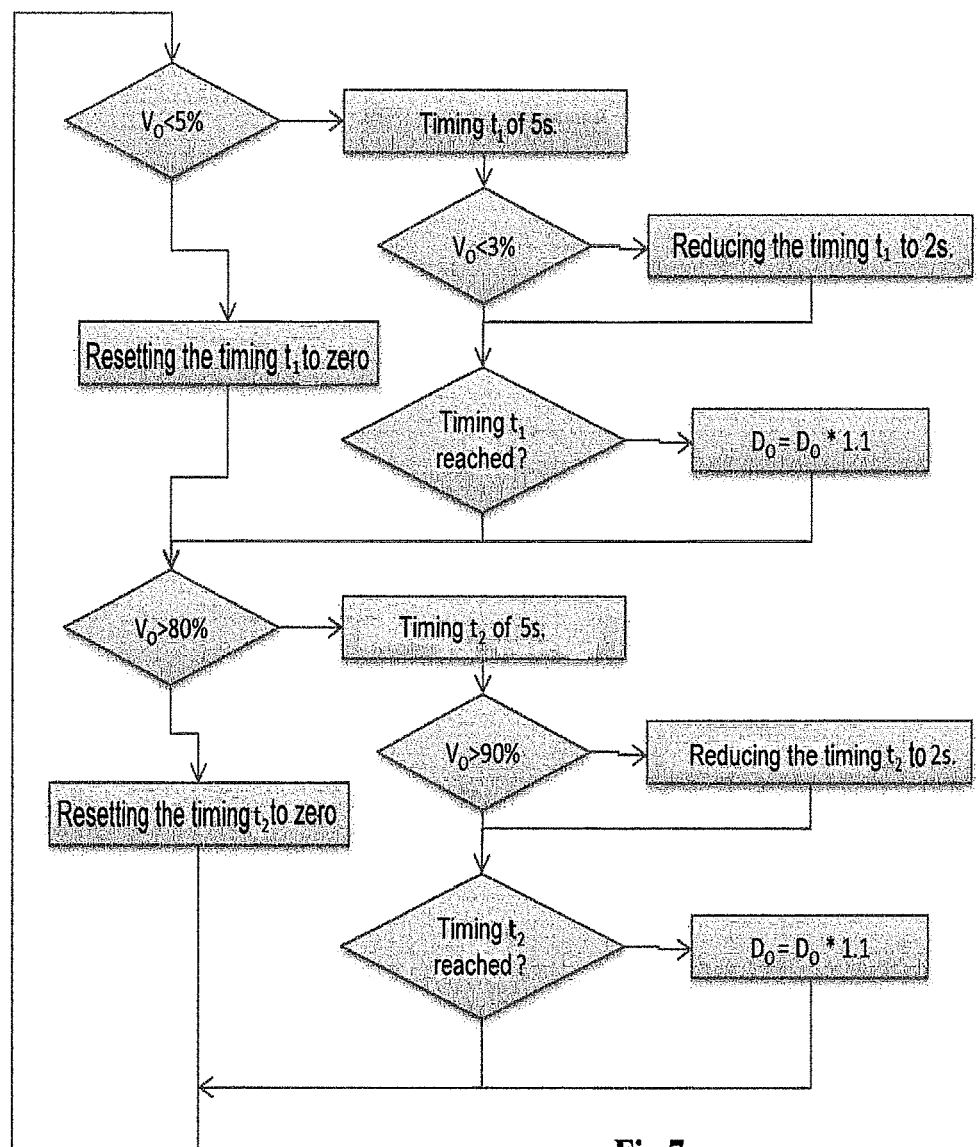
FIG. 7 is a computer flow diagram of the regulation in accordance with the invention of the flow rate $D_O$ of the chambers for circulating oxygen as a function of the opening percentage of the valve $V_O$ in a high-temperature electrolysis module according to FIGS. 9-18.
Figure 8:
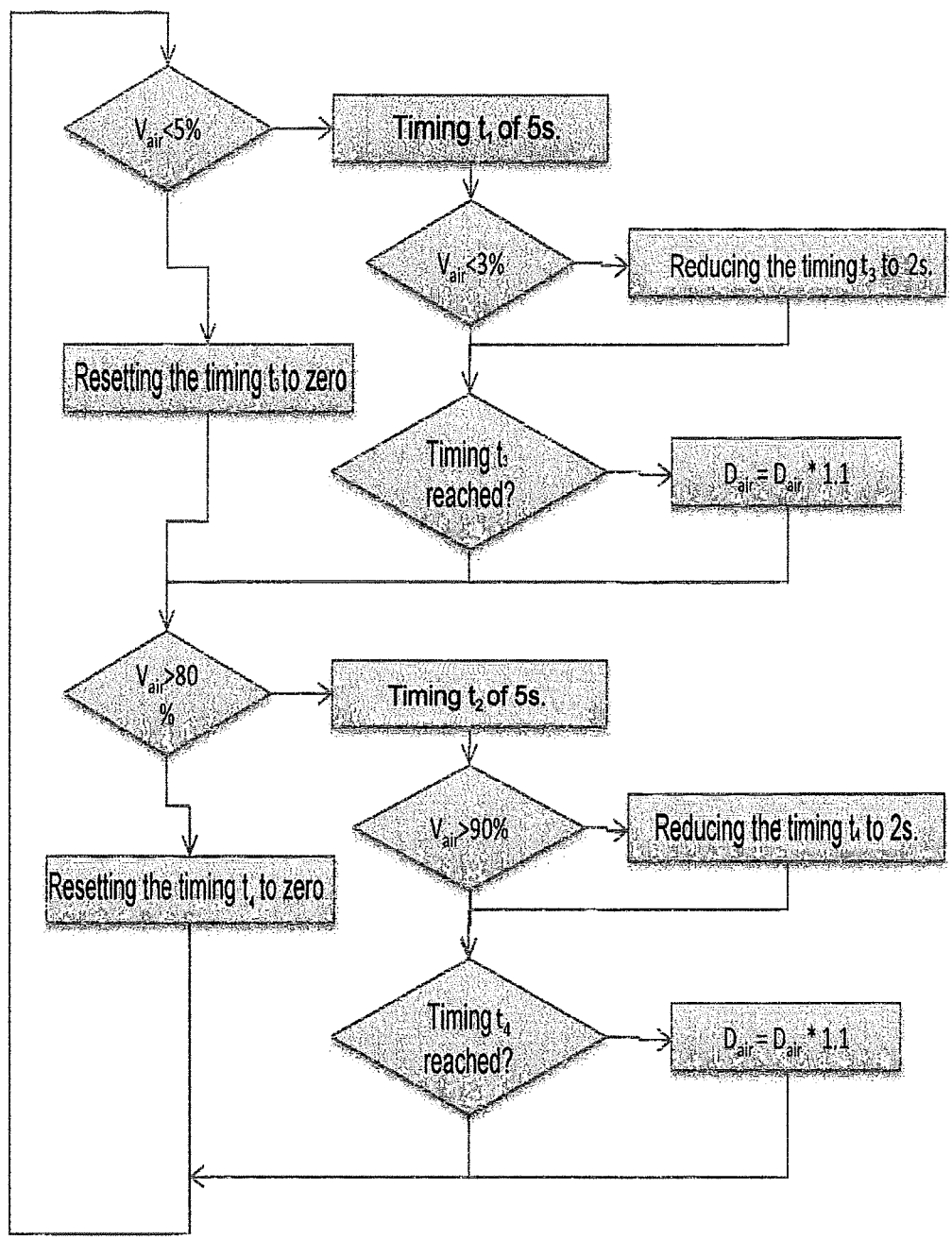
FIG. 8 is a computer flow diagram of the regulation in accordance with the invention of the flow rate $D_{air}$ of the enclosure under pressure as a function of the opening percentage of the valve $V_{air}$ in a high-temperature electrolysis module according to FIGS. 9-18.

FIGS. 7 and 8 provide numerical values corresponding to the implementation of the invention in such a reactor.

More precisely, FIG. 7 gives the detail of the loop for regulating the flow rate of oxygen $D_O$ as a function of the opening state of the regulating valve $V_O$:

if $V_O < 5\%$ for 5 seconds, then $D_O$ is increased by 10%;
if $V_O < 3\%$ for 2 seconds, then $D_O$ is increased by 10%;
if $V_O > 80\%$ for 5 seconds, then $D_O$ is reduced by 10%;
if $V_O > 90\%$ for 2 seconds, then $D_O$ is reduced by 10%.

FIG. 8 provides the detail of the loop for regulations of the flow rate $D_{air}$ as a function of the opening state of the valve $V_{air}$:

if $V_{air} < 5\%$ for 5 seconds, then $D_{air}$ is increased by 10%;
if $V_{air} < 3\%$ for 2 seconds, then $D_{air}$ is increased by 10%;
if $V_{air} > 80\%$ for 5 seconds, then $D_{air}$ is reduced by 10%;
if $V_{air} > 90\%$ for 2 seconds, then $D_{air}$ is reduced by 10%.

The module M1 of the electrolysis reactor includes an elementary electrochemical cell (C1) having a shape axisymmetric about a central axis X, the cell being formed from a cathode, an anode, and an electrolyte inserted between the cathode and the anode, with two electric and fluid interconnects 5.1, 5.2 on either side of the cell.

The two interconnects 5.1, 5.2 are each produced from a single metal piece, preferably from ferritic steel having approximately 20% chromium, preferably from CROFER® 22APU or F18TNb, or based on Inconel® 600 or Haynes® type nickel.

The upper interconnect 5.1 has, bored therethrough, a conduit 50 for carrying the steam, opening along the central axis onto the cell on the cathode side. As explained hereafter, there is provided a radial distribution of the carried steam and of the produced hydrogen up to a conduit 59 for covering the produced hydrogen, opening parallel to the central axis at the periphery of the cell on the cathode side.

The lower interconnect 5.2 has, bored therethrough, a conduit 51 for carrying draining gas, such as air, opening along the central axis onto the cell on the anode side. As explained hereafter, there is provided a radial distribution of the carried air and of the produced oxygen up to a conduit 54 for recovering the produced oxygen, opening parallel to the central axis at the periphery of the cell on the anode side.

A first sealing joint 61, having a shape axisymmetric about the central axis X, is arranged at the periphery of the elementary cell C1 and bearing at the same time against each of the two interconnects. This joint is provided to produce the seal around the cathode compartment.

A second sealing joint 63, having a shape axisymmetric about the central axis, is arranged at the periphery of the anode of the elementary cell and bearing at the same time against the lower interconnect and against the electrolyte. This joint is provided in order to produce the seal around the anode compartment. The sealing joints 61 and 63 are glass and/or vitroceramic-based, as is detailed later.

An electrical insulating and sealing device 8 having a shape axisymmetric about the central axis X is arranged at the periphery of the first sealing joint around the cathode compartment.

The device 8 is made up of an electrically insulating washer 80 forming a wedge, clamped by third and fourth metal sealing joints 81, 82 without contact therebetween. Each of these third and fourth joints 81, 82 is metal and bears against the upper and lower interconnect, respectively.

The lower interconnect 5.2 has, bored therethrough, at least one carrying conduit 58 for a gas, called an equalizing gas, and at least one recovering conduit 58 for this equalizing gas opening onto the annular space E defined between the joint 61 and the device 8 such as to produce an annular distribution of the equalizing gas in order to equalize the pressures on either side of the first sealing joint 61 during operation.

The device 8 is suitable for resisting a large differential in pressures between the pressure of the equalizing gas, that is carried thanks to the regulation according to the invention to the closest possible value to the operating pressure of the HTE reactor, typically from 10 to 30 bar, and the pressure outside the module, typically 1 bar. The insulating washer 80 makes it possible to prevent any short circuit between the lower interconnect 5.2 and the upper interconnect 5.1. Finally, the metal joints are suitable for having expansions compatible with the materials of the interconnects, particularly ferritic stainless steel-based interconnects.

In addition to what has already been described, the upper interconnect 5.1 has, bored therethrough, a carrying lateral conduit 52 opening into the carrying central conduit 50, as may be seen in FIG. 12. The upper interconnect also comprises an annular recess 53 for receiving the upper metal joint 81 and the insulating wedge 80 (FIGS. 10 and 11).

The lower interconnect 5.2 includes a bearing area on which both the second joint 63 and the elementary cell are positioned. From the immediate periphery of the cell outward, the lower interconnect 5.2 comprises an annular recess 54 for the radial flow of the mixture $H_2O/H_2$, a planar surface and another annular recess 55 concentric with that around the cell in order to receive the sealing device 8. The planar surface has, bored therethrough, a carrying lateral conduit intended to connect with the carrying central conduit 51 of the upper interconnect 5.1, as may be seen in FIG. 13.

As may be seen in FIG. 14, the planar surface of the lower interconnect is used as a support for the joint 61 and around the carrying lateral conduit 56. The joint 61 is made up of a mica ring 610 between two vitroceramic washers or rings 613, 614 each moreover bearing on the first 5.1 and the second 5.2 interconnects.

Figure 10:
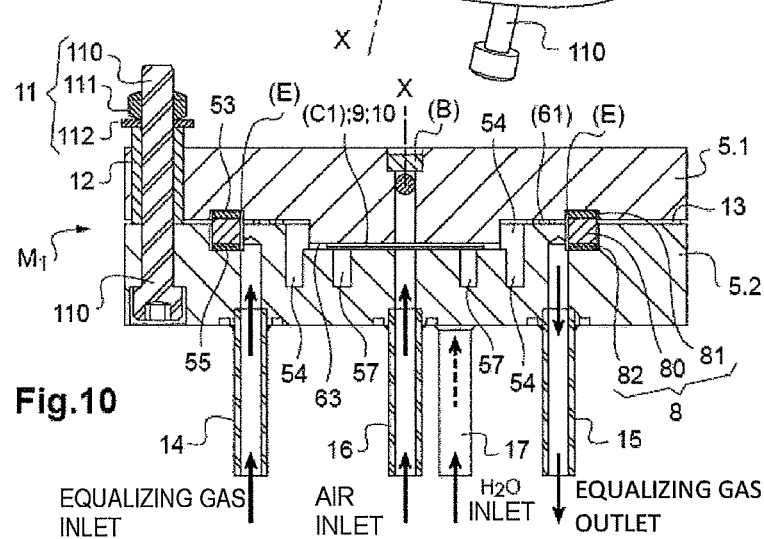
FIG. 10 is a sectional view of the module assembled according to FIG. 9, the section being produced in the plane for circulating the equalizing gas, respectively.

As may be seen in FIGS. 10 and 11, the lower interconnect has, bored therethrough, an annular recess 55 opening into the carrying 58 and recovering 58 conduits for the equalizing gas.

Each of the carrying 58 and recovering 58 conduits for the equalizing gas opens into the housing recess 55 for the sealing device 8 (FIGS. 10 and 11). According to the invention, there is provided a lateral mounting clearance for the sealing device 8 in the recesses 53, 55 of the upper 5.1 and lower 5.2 interconnect, respectively which is sufficient to allow the passage of the equalizing gas into the annular space (E) defined in this manner between device 8 and the inside of the recesses 53, 55. As may be seen in detail in FIG. 11, it is the passage produced at the end of boring the carrying conduit 58 inside the sealing device 8 which allows for the arrival of the equalizing gas in the annular space (E) and thus for the annular distribution of the latter. In a way, this annular distribution of the equalizing gas forms a peripheral curtain of gas around the reactive gas compartments, which makes it possible to equalize the pressures.

Thanks to the presence of the recesses 54, 57 for distributing the reactive gases on the lower interconnect 5.2, the module according to the invention with the two interconnects and the cell with geometry that is axisymmetric about the axis X allows the cell to be homogenously and radially fed with reactive gases regardless of the pressure level.

Figure 9:
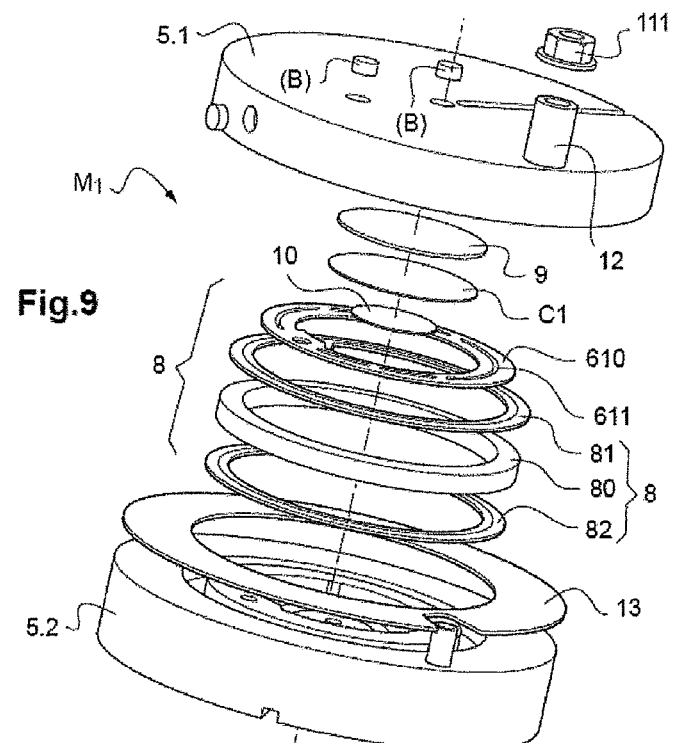
FIG. 9 is an exploded view of an embodiment of a HTE module according to the patent application filed in France on Dec. 18, 2014 under the no. 14 62699 and used as part of a system according to the invention.

As illustrated in FIG. 9, an electrolysis module M1 may advantageously include electrical contact grids 9, 10 which may particularly have the effect of compensating for unevenness in order to obtain a better electrical contact between, firstly, the upper interconnect and the cathode and, secondly, between the lower interconnect and the anode.

Advantageously, as may be seen in FIG. 9, the module M1 may comprise, at the periphery of the insulating and sealing device 8, an electrically insulating ring 13, of the mica type, the ring 13 bearing on all of the areas where the two peripheral surfaces of the interconnects 5.1 and 5.2 face one another.

FIGS. 14-18 show a HTE reactor including two modules M1, M2 each produced like the module described above, which are stacked one upon the another.

In this reactor, the lower interconnect 5.2 of the upper module M1 and the upper interconnect 5.2 of the lower module M2 are produced from the same metal alloy component.

Figure 15:
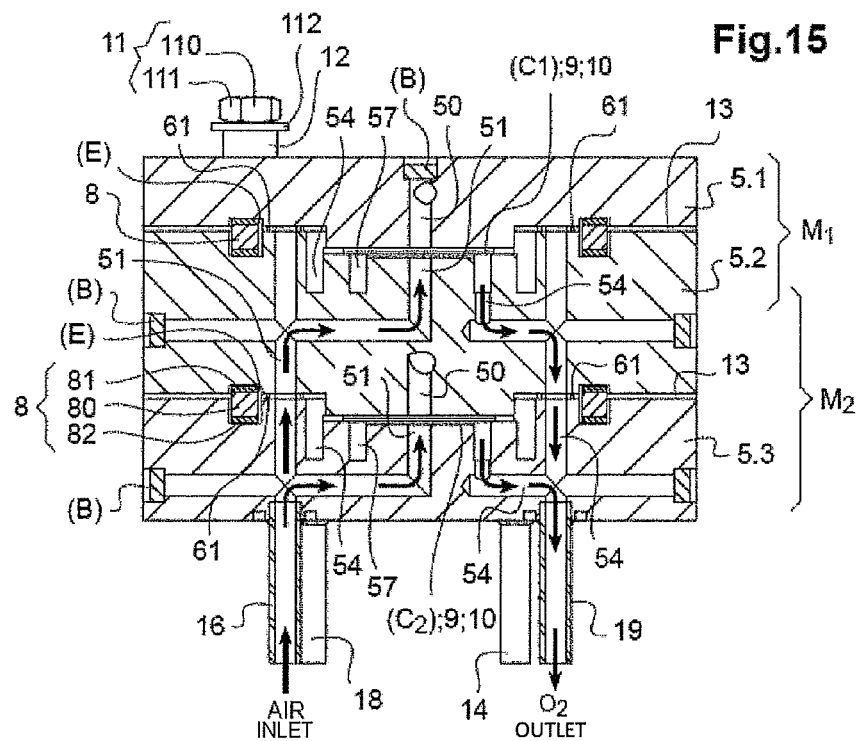
FIGS. 15, 16 and 17 are sectional views of a module assembled according to FIG. 14, the section being produced in the plane for circulating the carried air and the produced oxygen, in the plane for circulating the carried steam and the produced hydrogen, and finally in the plane for circulating the equalizing gas, respectively.
Figure 16:
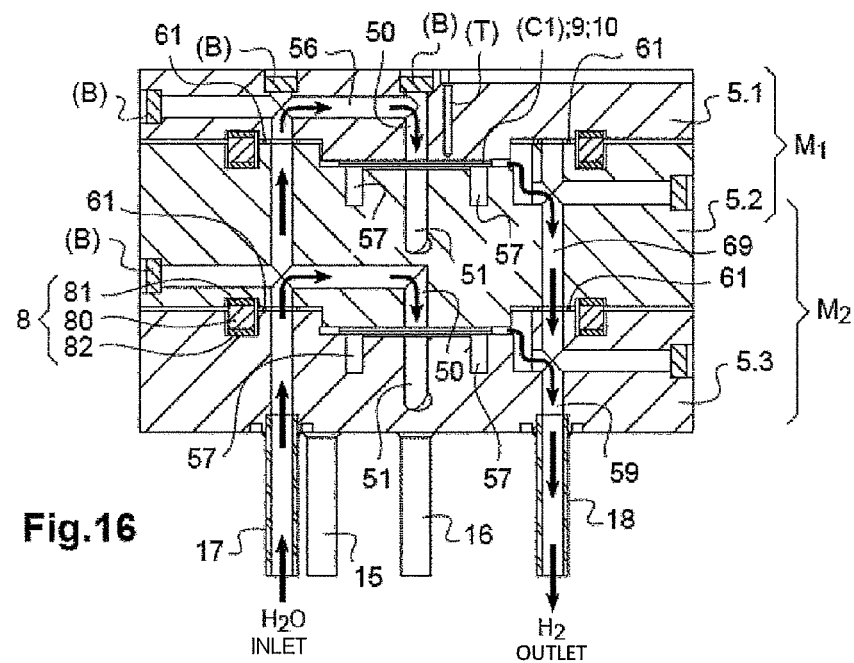

As may be seen in FIGS. 15 and 16, the various vertical and horizontal bores through the superposed interconnects 5.1-5.3 make it possible to produce, at the periphery then along the central axis X, the carrying conduits for air 51 (FIG. 15) and for steam 56, 50 (FIG. 16), respectively, and at the periphery for the recovering conduits, 54, for the produced oxygen and, 59, for the hydrogen, respectively, for each electrolysis cell C1, C2.

Figure 17:
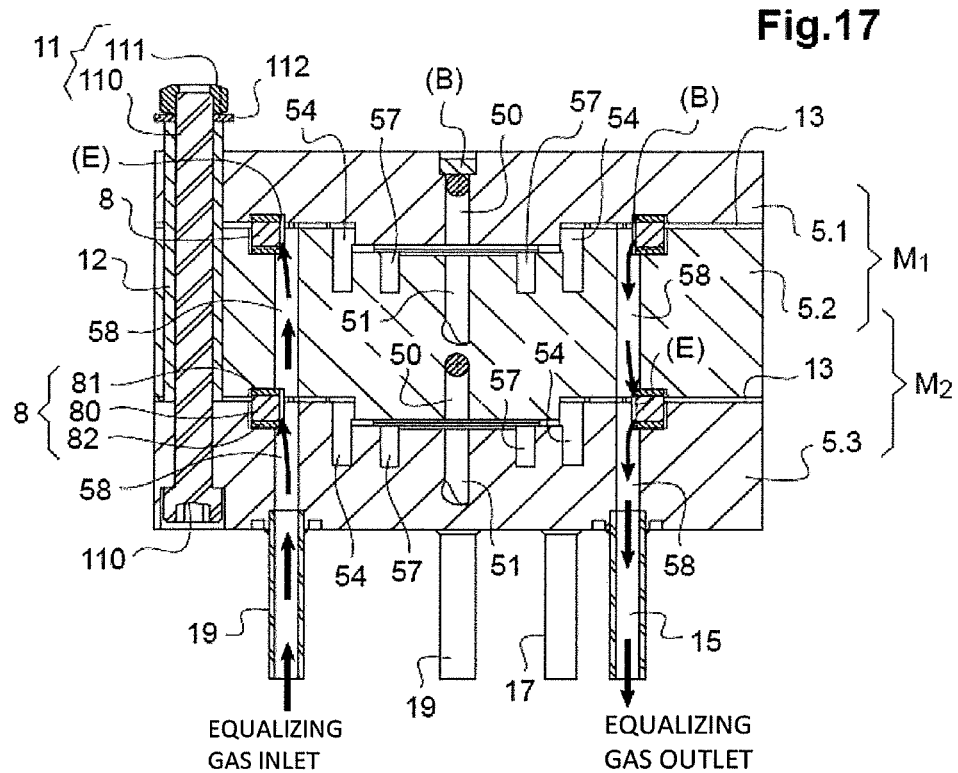

As may be seen in FIG. 17, the various vertical bores through the superposed interconnects 5.1-5.3 make it possible to produce, at the periphery, the carrying and recovering conduits 58 for the equalizing gas around each electrolysis cell C1, C2.

According to an advantageous embodiment, the module or the reactor according to the invention incorporates a bolt 11 mounted to pass through housings produced in the interconnects. As may be seen in FIGS. 10 and 17, the head 110 of the through-bolt 11 rests in a housing of an end interconnect 5.2 or 5.3 and a nut 111 screwed onto the through-bolt projects on the other end interconnect 5.1, the nut 111 indirectly bearing via a washer 112 on an electric insulating sleeve 12 mounted in the housing of the upper interconnect 5.2 or 5.1. The bolt 11 prevents the untimely opening of each module during the operation under pressure, which provides operating safety but not the compressive clamping of each cell between the interconnects. The clamping, which ensures the sealing and the electrical contact, is moreover produced by applying a well-suited compressive effort from one interconnect onto the other. The chains of dimensions of all of the components of the modules are determined in order to ensure squashing of the sealing joints 81, 82 at the periphery, and the possible squashing of the electric contact grids 9, 10. Typically, the squashing produced by clamping is a few dozen microns. Of course, it is ensured that the compressive clamping effort is adjusted when the pressure rises inside the module according to the invention.

Figure 18:
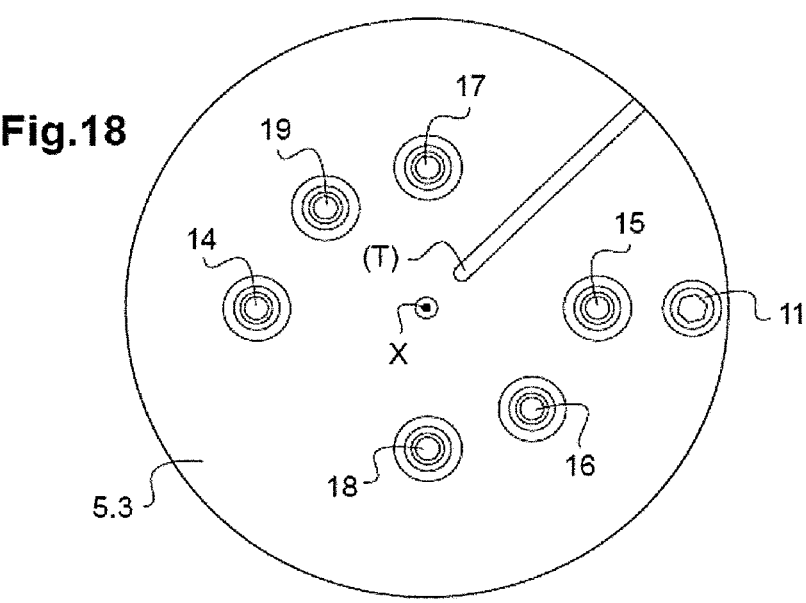
FIG. 18 is a view of the bottom of an electrolysis reactor according to FIGS. 14-17.

Finally, several pipes are connected to the various gas carrying and recovering conduits produced in the interconnects in the following manner:

- a lateral-carrying pipe 14 for the equalizing gas is connected to the lateral-carrying conduit 58 of the lower interconnect 5.2 or 5.3, whereas a recovering pipe 15 for the equalizing gas is connected to the lateral-recovering conduit 58 of the lower interconnect (FIGS. 10, 17 and 18);
- an air central-carrying pipe 16 is connected to the carrying central pipe of the lower interconnect 5.2 or 5.3 (FIGS. 12, 13, 15 and 18), whereas a recovering pipe 19 for the produced oxygen is connected to the annular recess 57 of the lower interconnect 5.2 or 5.3 (FIGS. 12, 13, 15 and 18);
- a steam central-carrying pipe 17 is connected to the carrying lateral conduit of the lower interconnect 5.2 or 5.3 itself opening onto that of the upper interconnect 5.1 (FIGS. 13, 16 and 18), whereas a recovering pipe 18 for the produced hydrogen is connected to the lateral-recovering conduit 59 of the lower interconnect (FIGS. 13, 16 and 18).

The operation of a HTE reactor is now described, which reactor comprises several modules according to the invention which have just been described, the modules being stacked upon one another, like that shown in FIGS. 14-18.

Steam is fed to the pipe 17 and therefore the steam carrying conduits 56, 52 and 50 and simultaneously equalizing gas to the pipe 14 and therefore the carrying conduit 58 and the annular space E, the pressure of the carried steam being substantially equal to that of the equalizing gas.

Also simultaneously, the pipe 16 is fed with air, as draining gas, as is therefore the carrying conduit 51, the pressure of the carried air being substantially equal to that of the equalizing gas.

The steam distributed radially from the carrying conduit 50 and the hydrogen produced by the electrolysis of the steam circulates in the annular recess 54 and then is recovered radially in the recovering conduit 59 and therefore by the recovering pipe 18 (FIGS. 12 and 16).

The equalizing gas circulates in the annular space E and is recovered in the recovering conduit 58 and therefore by the recovering pipe 15 (FIGS. 10 and 17).

The air distributed radially from the carrying conduit 51 and the oxygen produced by the electrolysis of the steam circulates radially in the annular recess 57 and then is recovered by the recovering pipe 19 (FIGS. 13 and 15).

In the module M1 or the reactor with a stack of modules M1, M2 according to the invention, no feed current passes through all of the pipes 14-19.

Other alternatives and advantages of the invention may be carried out without necessarily departing from the scope of the invention.

The invention is not limited to the examples which have just been described; in particular it is possible to combine, with one another, features of the illustrated examples within non-illustrated alternatives.

CITED REFERENCES

[1]: "*Experimental investigation of the effect of operating pressure on the performance of SOFC and SOEC*", A. Momma, K. Takano, Y. Takana, T. Kato, A. Yamamoto,

[2]: "*High temperature pressurized experiment design, operation and result*", J. E. O'Brien, X Zhang, G. K. Housley, K. DeWall, L. Moore-McAteer, G. Tao, DOI 10.1002/fuce 201300076,

[3]: "*A validated multi-scale model of a SOFC stack at elevated pressure*", M. Henke, C. Willich, C. Westner, F. Leucht, J. Kallo, W. G. Bessler and K. A. Friedrich, Journal of Power Sources, 196(2011) 7195-7202,

[4]: "*An experimental investigation of pressurized planar solid oxide fuel cells using two different flow distributors*", H. W. Chang, C. M. Huang, S. S. Shy, International Journal of Hydrogen Energy, vol. 38 (2013), 13774-13780,

[5]: "*Pressurized testing of a planar solid oxide fuel cell stack*", A. A. Burke, L. G. Carreiro, J. R. Izzo Jr., International Journal of Hydrogen Energy, vol. 35 (2010), 9544-9549,

[6]: "*Hydrogen and synthetic fuel production using pressurized solid oxide electrolysis cells*", S. Højgaard Jensen, X. Sun, S. Dalgaard Ebbesen, R. Knibbe, M. Mogensen, ECS Transactions, 57 (1) 699-708 (2013),

[7]: "*Pressurized solid oxide fuel cells: Experimental studies and modeling*", S. Seidler, M. Henkea, J. Kalloa, W. G. Besslera, U. Maierb, A. Friedrich, Journal of Power Sources, 250(2014) 21-29.

The invention claimed is:

1. A system comprising:
at least one first chamber in which a first gas, which is a potentially wet gas, is suitable for circulating;
at least one first feed line configured to feed potentially wet gas to an inlet of the first chamber up to a maximum operating pressure $P_{max}$, the first feed line comprising a first flow rate regulator configured to regulate a flow rate of the first gas $D_H$ between a zero value and a maximum value $D_{H,max}$;
at least one second chamber in which a second gas is suitable for circulating;
at least one second feed line configured to feed the second gas to an inlet of the second chamber, the second feed line comprising a second flow rate regulator configured to regulate the flow rate of the second gas $D_O$ between a zero value and a maximum value $D_{O,max}$;
an enclosure in which the first and second chambers are housed, in which enclosure a third gas, as an equalizing gas, is suitable for circulating, the enclosure configured to operate under pressure of the equalizing gas up to the maximum operating pressure $P_{max}$;
a third feed line configured to feed an inside of the enclosure with equalizing gas, the third feed line comprising a third flow rate regulator configured to regulate a flow rate of the equalizing gas $D_{air}$ between a zero value and a maximum value $D_{air,max}$;
sensors for pressure configured to measure pressure in each of the first and second chambers and in the enclosure, between atmospheric pressure and the maximum pressure value $P_{max}$;
at least three regulating valves, regulating valve $V_H$ for the wet gas, regulating valve $V_O$ for the second gas and regulating valve $V_{air}$ for the equalizing gas, the at least three regulating valves are arranged outside the enclosure and on an outlet line of the first chamber or chambers, of the second chamber or chambers, and of the enclosure, respectively, each valve configured to operate at a temperature greater than condensation temperature of the wet gas at the maximum pressure $P_{max}$ considered, each valve configured to be opened from 0% to 100% and having a capacity $K_v$ suited to the maximum pressure $P_{max}$ and to the average flow rate of the gas considered on each of the three outlet lines;

means for heating the lines containing the wet gas to a temperature greater than the condensation temperature of the wet gas at the maximum pressure $P_{max}$ considered;
command and automatic control means for commanding and automatically controlling the three regulating valves as a function of differences in pressure values measured by the pressure sensors to obtain a minimum difference in pressure between the first chamber or chambers, the second chamber or chambers, and the enclosure, the command and automatic control means being configured to command and automatically control the flow rate regulators for the second gas and for the equalizing gas as a function of an opening state of the regulating valves for the second gas and for the equalizing gas, to prevent complete opening or closing states of the valves for the second gas and for the equalizing gas;
wherein, $Vol_H$ being volume of the first chamber or chambers and the lines for circulating gas upstream and downstream of the first chamber or chambers, $Vol_O$ being volume of the second chamber or chambers and the lines for circulating gas upstream and downstream of the second chamber or chambers, and $Vol_{air}$ being volume of the enclosure and the lines for circulating gas upstream and downstream of the enclosure, $Vol_{air}$ being larger than $Vol_H$ and/or $Vol_O$, the first, second and third flow rate regulators are dimensioned to comply with the ratio:

$$\frac{Vol_H}{D_{H,max}} = \frac{Vol_O}{D_{O,max}} = \frac{Vol_{air}}{D_{air,max}}.$$

2. The system as claimed in claim 1, further comprising a condenser for the wet gas arranged downstream of the regulating valve on the outlet line of the first chamber or chambers.

3. The system as claimed in claim 1, further comprising a high-temperature electrolysis or co-electrolysis (HTE) reactor comprising a stack of solid oxide elementary (co-) electrolysis cells each comprising an anode, a cathode, and an electrolyte inserted between the anode and the cathode, the cells being electrically connected in series, the stack comprising two electric terminals for feeding current to the cells and defining chambers for circulating steam and hydrogen or steam, hydrogen and carbon dioxide ($CO_2$) on the cathodes as first chambers, and chambers for circulating air or nitrogen or oxygen or a gas mixture containing oxygen on the anodes as second chambers.

4. The system as claimed in claim 1, further comprising a high-temperature fuel-cell (SOFC) stack comprising a stack of solid oxide elementary electrochemical cells each comprising an anode, a cathode, and an electrolyte inserted between the anode and the cathode, the cells being electrically connected in series, the stack comprising two electric terminals for cell current recovery and defining chambers for circulating dihydrogen or another fuel gas or a mixture containing a fuel gas on the anodes as first chambers and chambers for circulating air or nitrogen or oxygen or a gas mixture containing oxygen on the cathodes as second chambers.

5. The system as claimed in claim 1, comprising at least three sensors for absolute pressure configured to each measure pressure in each of the first chambers, in each of the second chambers, and in the enclosure, respectively.

6. The system as claimed in claim 1, comprising at least one sensor for absolute pressure $P_H$, configured to each measure pressure in each of the first chambers, and comprising at least two differential sensors for pressure configured to measure the difference in pressure between the second chamber or chambers and the first chamber or chambers $\Delta P_O=(P_O-P_H)$ and between the enclosure and the first chamber or chambers $\Delta P_{air}=(P_{air}-P_H)$, respectively.

7. The system as claimed in claim 1, further comprising bypass valves each arranged in parallel with the regulating valves, respectively.

8. An operating method for the system as claimed in claim 1, comprising:
   a) defining following operating setpoints:
      a1) defining a flow rate $D_H$ that corresponds to quantity of potentially wet gas necessary for a predetermined electrochemical operating point;
      a2) defining a flow rate $D_O$ that corresponds to quantity of second gas necessary for a predetermined electrochemical operating point;
      a3) defining a flow rate $D_{air}$ that corresponds to quantity of second gas necessary for detection and safety with regard to the leaks and for preventing formation of an explosive atmosphere in the enclosure;
      a4) defining a pressure $P_{setpoint}$ for the predetermined operating point;
      a5) defining the differential pressure $\Delta P_{O,setpoint}$ corresponding to the deviation in pressures between that prevailing in the second chamber or chambers and that in the first chamber or chambers;
      a6) defining the differential pressure $\Delta P_{air,setpoint}$ corresponding to the deviation in pressures between that in the enclosure and that prevailing in the first chamber or chambers;
   b) using the following regulations:
      b1) actuating the first gas flow rate regulator(s) to regulate the flow rate $D_H$ of the wet gas;
      b2) actuating the second gas flow rate regulator(s) to regulate the flow rate $D_O$ entering the second chamber or chambers;
      b3) actuating the third gas flow rate regulator(s) to regulate the flow rate $D_{air}$ entering the enclosure;
      b4) actuating the regulating valve $V_H$ for the wet gas to regulate the actual pressure $P_H$ of the first chamber or chambers to the setpoint value $P_{setpoint}$;
      b5) actuating the regulating valve $V_O$ for the second gas such that the actual differential pressure between the second chamber or chambers and the first chamber or chambers $\Delta P_O=(P_O-P_H)$ is regulated as a function of the error measured with respect to the setpoint $(\Delta P_{O,setpoint}-\Delta P_O)$, such that the pressure $P_O$ of the second gas follows that $P_H$ of the first chamber or chambers with the setpoint differential pressure $\Delta P_{O,setpoint}$;
      b6) actuating the regulating valve $V_{air}$ for the equalizing gas such that the actual differential pressure between the enclosure and the first chamber or chambers $\Delta P_{air}=(P_{air}-P_H)$ is regulated as a function of the error measured with respect to the setpoint $(\Delta P_{air,setpoint}-\Delta P_{air})$, such that the pressure $P_{air}$ of the equalizing gas of the enclosure that $P_H$ of the first chamber or chambers with the setpoint differential pressure $\Delta P_{air,setpoint}$.

9. The operating method as claimed in claim 8, further comprising a flow rate increasing for the second gas $D_O$ and for the equalizing gas $D_{Air}$ if the regulating valves for the second gas $V_O$ and for the equalizing gas $V_{Air}$, respectively, are close to a complete closing state.

10. The operating method as claimed in claim 8, further comprising a flow rate reducing for the second gas $D_O$ and for the equalizing gas $D_{Air}$ if the regulating valves for the second gas $V_O$ and for the equalizing gas $V_{Air}$, respectively, are close to a complete opening state.

\* \* \* \* \*